(12) United States Patent
Takakuma et al.

(10) Patent No.: US 8,323,368 B2
(45) Date of Patent: Dec. 4, 2012

(54) PRODUCTION METHOD OF POLISHING COMPOSITION

(75) Inventors: Noriyuki Takakuma, Toyama (JP); Isao Ota, Toyama (JP); Kenji Tanimoto, Toyama (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 125 days.

(21) Appl. No.: 11/920,532

(22) PCT Filed: May 10, 2006

(86) PCT No.: PCT/JP2006/309414
§ 371 (c)(1),
(2), (4) Date: Dec. 5, 2007

(87) PCT Pub. No.: WO2006/123562
PCT Pub. Date: Nov. 23, 2006

(65) Prior Publication Data
US 2008/0254718 A1     Oct. 16, 2008

(30) Foreign Application Priority Data

May 20, 2005   (JP) .................................. 2005-147825

(51) Int. Cl.
*B24D 3/02*     (2006.01)
*C09C 1/68*     (2006.01)
*C09K 3/14*     (2006.01)

(52) U.S. Cl. ............................................ 51/309; 51/307
(58) Field of Classification Search ............ 51/307–309; 106/3; 451/36
See application file for complete search history.

(56) References Cited

U.S. PATENT DOCUMENTS

| | | | | |
|---|---|---|---|---|
| 5,935,278 A | * | 8/1999 | Ishitobi et al. ................. | 51/306 |
| 6,186,067 B1 | * | 2/2001 | Rorke et al. ................. | 101/467 |
| 7,678,703 B2 | * | 3/2010 | Takakura et al. ............. | 438/693 |
| 2002/0003179 A1 | * | 1/2002 | Verhoff et al. ................. | 241/21 |
| 2003/0172594 A1 | * | 9/2003 | Castro et al. ................. | 51/307 |

FOREIGN PATENT DOCUMENTS

| | | |
|---|---|---|
| JP | A-08-059242 | 3/1996 |
| JP | A-10-121034 | 5/1998 |
| JP | 11181407 | * 7/1999 |
| JP | B2-3130279 | 1/2001 |
| JP | A-2001-070825 | 3/2001 |
| JP | B2-3278532 | 4/2002 |
| JP | A-2005-197664 | 7/2005 |

* cited by examiner

*Primary Examiner* — Pegah Parvini
(74) *Attorney, Agent, or Firm* — Oliff & Berridge, PLC

(57) ABSTRACT

[Problems to Be Solved]
To provide a method for obtaining a polishing composition by which a polishing speed is high and the polished surface has little surface failure.

[Means to Solve the Problems]
The present invention relates to a production method of a polishing composition containing zirconia oxide sol including: baking at a temperature ranging from 400 to 1000° C., a zirconium compound having d50 (where d50 represents a particle diameter meaning that the number of particles having this particle diameter or less is 50% of the total number of particles) of zirconium compound particles of 5 to 25 μm and d99 (where d99 represents a particle diameter meaning that the number of particles having this particle diameter or less is 99% of the total number of particles) of zirconium compound particles of 60 μm or less, wherein d50 and d99 are measured by measuring a slurry of the zirconium compound by a laser diffractometry; and wet-grinding a powder of zirconium oxide obtained in the above baking in an aqueous medium until d50 of zirconium oxide particles becomes 80 to 150 nm and d99 of zirconium oxide particles becomes 150 to 500 nm, wherein d50 and d99 are measured by measuring the slurry of the zirconium compound by a laser diffractometry.

[Selected Drawings]None.

4 Claims, No Drawings

PRODUCTION METHOD OF POLISHING COMPOSITION

TECHNICAL FIELD

The present invention relates to a production method of a polishing composition containing a zirconium oxide sol obtained by a method in which a zirconium compound, such as a zirconium carbonate and a hydrate thereof is baked and wet-ground, and a production method of a semiconductor device using the polishing composition obtained by the above production method.

BACKGROUND ART

There are disclosed an aqueous sol of zirconium oxide obtained by a method including: baking colloidal zirconium oxide having a specific surface area of 10 to 400 m²/g and a particle diameter (measured by a dynamic light scattering method) of 20 to 500 nm and containing dewaterable moisture of 4 to 15% by weight, at a temperature of 400 to 1000° C. for 0.05 to 50 hours; adding to the zirconium oxide obtained by the baking, a water-soluble acid or a water-soluble alkali; and wet-grinding the resultant zirconium oxide; wherein the particle diameter (measured by a dynamic light scattering method) of the obtained aqueous sol of zirconium oxide is one to three times the particle diameter of the colloidal zirconium oxide before the baking, and a production method thereof (Patent Document 1).

Also, there is disclosed a polishing agent containing zirconia and a poly acid such as a polyacrylic acid (Patent Documents 2 and 3).

Also, there is known a method including: neutralizing an aqueous solution containing a water-soluble zirconium salt such as zirconium nitrate, zirconium sulfate and zirconium oxychloride with ammonia water to precipitate zirconium hydroxide; filtrating and washing with water the obtained precipitate; and dying and calcining the precipitate, or a method including: heat-hydrolyzing an aqueous solution of a water-soluble zirconium salt to generate a sot; and drying and calcining the sol (Non-Patent Document 1).

Further, there is known a method including: heat-hydrolyzing an aqueous solution of a water-soluble zirconium salt to generate a sol; and drying and calcining the sol (Non-Patent Document 2).

[Patent Document 1] JP-A 8-59242 (Clams and Examples)
[Patent Document 2] JP-B 3130279 (Claims)
[Patent Document 3] P-B 3278532 (Claims)
[Non-Patent Document 1] Ceramics Bifummatsu Gihjutsu (Ceramics Fine Particles Technology), edited by the Editorial Board of New-ceras Series, pp. 145-153, published by Gakkensha Co., Ltd., 1994
[Non-Patent Document 2] Inorganic Chemistry (Inorg. Chem.), Third Edition, p. 146, 1964

DISCLOSURE OF THE INVENTION

Problems to be Solved by the Invention

An aqueous slurry of an inorganic oxide in which an inorganic oxide such as silicon oxide and aluminum oxide is dispersed is used as an abrasive grain of a polishing agent for a chemical mechanical polishing to planarize a substrate having an uneven surface in a production process of a semiconductor device. However, recently, a polishing agent causing no disadvantage of a surface failure such as a scratch and a polished surface having high flatness and high quality can be obtained is vigorously required.

With respect to an aqueous slurry in which zirconium oxide particles are dispersed, various production methods are disclosed, however, there is a disadvantage wherein such conventional methods have complicated production processes and low productivity. Further, when a zirconium compound is baked to obtain zirconium oxide, generally the baking is performed by charging a ceramics container (sagger) filled with a raw material into an electric furnace or a baking gas furnace having a capacity of 0.5 m³ or more, however, the larger the baking furnace is, the more difficult the homogeneous baking of a zirconium compound is due to a temperature distribution caused in the furnace.

In the present invention, a zirconium oxide sol is obtained by a method in which a zirconium oxide powder obtained by baking a zirconium compound is wet-ground in an aqueous medium, however, depending on the type, the baking method, the grinding method or the like of the zirconium compound as a raw material, the properties of the obtained zirconium oxide sol are varied largely. An object of the present invention is to provide, in a case when applied to chemical mechanical polishing (CMP) in a production method of a semiconductor device, a method for obtaining a polishing composition containing a zirconium oxide sol by which a polishing rate, particularly a polishing rate of a copper film is high and a surface failure of a polished surface is caused seldom.

Means for Solving Problems

The present invention relates to the following aspects:

as a first aspect, a production method of a polishing composition containing zirconium oxide sol comprising the steps: baking at a temperature ranging from 400 to 1000° C., a zirconium compound having d50 (where d50 represents a particle diameter meaning that the number of particles having this particle diameter or less is 50% of the total number of particles) of zirconium compound particles of 5 to 25 μm and d99 (where d99 represents a particle diameter meaning that the number of particles having this particle diameter or less is 99% of the total number of particles) of zirconium compound particles of 60 μm or less, wherein d50 and d99 are measured by measuring a slurry of the zirconium compound by a laser diffractometry; and wet-grinding a powder of zirconium oxide obtained in the above baking in an aqueous medium until d50 of zirconium oxide particles becomes 80 to 150 nm and d99 of zirconium oxide particles becomes 150 to 500 nm, wherein d50 and d99 are measured by measuring a slurry of the zirconium compound by a laser diffractometry;

as a second aspect, the production method according to the first aspect, wherein the zirconium compound is a zirconium carbonate or a hydrate thereof;

as a third aspect, the production method according to the first or second aspect, wherein the balking includes: first baking in which the temperature is elevated from room temperature with a temperature elevating rate of 0.1 to 5° C./min until the temperature reaches a baking temperature of the first baking ranging from 200 to less than 400° C.; and second baking in which the temperature is elevated from the baking temperature of the first baking with a temperature elevating rate of 0.1 to 10° C./min until the temperature reaches a baking temperature of the second baking ranging from 400 to 1000° C.;

as a fourth aspect, the production method according to the third aspect, wherein the baking is performed in such a manner that the second baking is performed immediately after the temperature has reached the baking temperature of the first baking, or the second baking is performed after the temperature has been maintained at the baking temperature of the first baking for within 100 hours;

as a fifth aspect, the production method according to any one of the first to fourth aspects, wherein the wet-grinding is performed by grinding a zirconium oxide powder in an aqueous median by using stabilized zirconia grinding beads having a diameter of 0.1 to 3.0 mm in a volume ratio of (the zirconium oxide slurry):(the grinding beads) of 1:0.5 to 2.0 using a noncontiguous-type grinding apparatus;

as a sixth aspect, the production method according to any one of the first to fourth aspects, wherein the wet-grinding is performed by grinding a zirconium oxide powder in an aqueous medium by using a continuous-type grinding apparatus equipped with stabile zirconia grinding beads having a diameter of 0.03 to 1 mm, a stirring blade having a peripheral-speed of 1 to 15 m/sec and a grinding container under conditions where an introducing speed of the zirconium oxide slurry into the grinding container is (V/4 to V) L/min relative to a volume V of the grinding container and a volume ratio of (the zirconium oxide slurry):(the grinding beads) is 1:0-5 to 0.9 in the grinding container;

as a seventh aspect, a production method of a semiconductor device in which a polishing composition obtained by the method according to any one of the first to sixth aspects is used in planarization of a substrate having an uneven surface; and as an eighth aspect, the production method of a semiconductor device according to the seventh aspect, wherein the uneven surface is an uneven surface formed with a copper or copper alloy film.

Effects of the Invention

A zirconium oxide sol produced from the zirconium oxide powder according to some aspects of the present invention is used as a polishing agent and is used as a polishing agent for a chemical mechanical polishing in a process for planarizing a substrate having an uneven surface in a production process of a semiconductor device. For example, the zirconium oxide sol produced from the zirconium oxide powder according to some aspects of the present invention is useful as (1) a polishing agent for a substrate having an uneven surface formed of copper or copper alloy film as a surface to be polished, (2) a polishing agent for polishing a Ta or TEN film formed for the purpose of preventing the diffusion of copper on an insulating film exposed after the planarization of the uneven surface formed of copper or copper alloy, and (3) a polishing agent for planarizing a substrate having an uneven surface formed containing an interlayer insulating film, a low-dielectric constant film and an insulating film for the trench separation as a surface to be polished. Also, the zirconium oxide sol according to some aspects of the present invention is useful also as (4) a polishing agent for a quartz crystal containing mainly silica, a quartz glass for a photo mask, a glass hard disc substrate and the like.

BEST MODES FOR CARRYING OUT THE INVENTION

The present invention is a production method of a polishing composition containing zirconium oxide sol including:

baking at a temperature ranging from 400 to 1000° C., a zirconium compound having d50 (where d50 represents a particle diameter meaning that the number of particles having this particle diameter or less is 50% of the total number of particles) of zirconium compound particles of 5 to 25 μm and d99 (where d99 represents a particle diameter meaning that the number of particles having this particle diameter or less is 99% of the total number of particles) of zirconium compound particles of 60 μm or less, wherein d50 and d99 are measured by measuring a slurry of the zirconium compound by a laser diffractometry; and wet-grinding a powder of zirconium oxide obtained in the above baking in an aqueous medium until d50 of zirconium oxide particles becomes 80 to 150 nm and d99 of zirconium oxide particles becomes 150 to 500 nm, wherein d50 and d99 are measured by measuring a slurry of the zirconium compound by a laser diffractometry.

A zirconium compound used in the present invention is a zirconium carbonate or a hydrate thereof and for example, a zirconium carbonate, such as zirconium carbonate ($Zr(CO_3)_2$), basic zirconium carbonate ($ZrCO_4 \cdot ZrO_2 \cdot 8H_2O$), and zirconium oxycarbonate ($ZrO(CO_3)$) is preferably used.

In the present invention, these zirconium carbonates are used in the following baking, however, as these zirconium carbonates, a zirconium carbonate obtained via a zirconium salt can be also used. In the present invention, a zirconium carbonate obtained by, for example a method in which basic zirconium carbonate obtained as a precipitation by adding sodium carbonate to an aqueous solution of a zirconium salt such as zirconium oxychloride ($ZrOCl_2$) and zirconium oxynitrate ($ZrO(NO_3)_2 \cdot 2H_2O$) is used, a method in which oxyzirconium carbonate obtained by introducing carbon dioxide into an aqueous solution of zirconium hydroxide ($Zr(OH)_4$) obtained by hydrolyzing zirconium nitrate ($Zr(NO_3)_4$) is used, and a method in which zirconium oxycarbonate obtained by introducing carbon dioxide into an aqueous solution of a mixture of zirconium nitrate and ammonium carbonate, can be used. The total content of an alkali metal element or an alkaline earth metal element contained as impurities in a zirconium carbonate or a hydrate thereof is preferably less than 1% by weight, based on the weight of the finally obtained zirconium oxide and it is preferred to render the content of the impurities within the above range by water-washing a zirconium carbonate or a hydrate thereof to remove the impurities. The zirconium carbonate or the hydrate thereof is a water-insoluble powder.

In the present invention, a zirconium compound such as a zirconium carbonate and a hydrate thereof is characterized by the particle diameter distribution thereof. With respect to the zirconium compound, a zirconium compound from which a slurry in which particles of the zirconium compound have d50 of 5 to 25 μm and d99 of 60 μm or less, wherein d50 and d99 are measured by a laser diffractometry, is obtained by dispersing the zirconium compound in an aqueous medium, is used as a raw material.

In the specification, d50 represents a particle diameter meaning that the number of particles having this particle diameter or less is 50% of the total number of particles, and d99 represents a particle diameter meaning that the number of particles having this particle diameter or less is 99% of the total number of particles. The d50 represents a value of an average secondary particle diameter.

In the laser diffractometry, the measurement is performed, for example using an apparatus such as Mastersizer (trade name; manufactured by Malvern Instruments Ltd.) and a particle diameter of particles in a slurry or a sol is measured. When particles are agglomerated with or adhered to each other, a particle diameter of the agglomerated particles is measured. By a dynamic light scattering method, also a particle diameter of particles in a slurry or a sol is measured and when particles are agglomerated with or adhered to each other, a particle diameter of the agglomerated particles is measured.

On the other band, a particle diameter converted from a specific surface area value measured by an adsorption of a nitrogen gas to a dried product obtained by drying a slurry or a sol (i.e., a particle diameter converted from a specific surface area measured by a gas adsorption method) is measured as an average value of particle diameters of individual particles.

In the present invention, a zirconium compound such as a zirconium carbonate or a hydrate thereof having the above particle diameter distribution is subjected to a baking treatment. The baking treatment includes: first baking in which the temperature is elevated from room temperature (usually 20° C.) with a temperature elevating rate of 0.1 to 5° C./min until the temperature reaches a baking temperature of the first baking ranging from 200 to less than 400° C.; and second baking in which the temperature is elevated from the baking temperature of the first baking with a temperature elevating rate of 0.1 to 10° C./min until the temperature reaches a baking temperature of the second baking ranging from 400 to 1000° C.

The first baking is started from room temperature (usually 20° C.). However, when the baking furnace is used frequently, the temperature is not lowered to room temperature and the baking can be started from, for example around 40° C.

The baking is performed by a method in which the second baling is performed immediately after the temperature has reached the baking temperature of the first baking, or by a method in which the second baking is performed after the temperature has been maintained at the baking temperature of the first baking for within 100 hours. When the temperature is maintained in the first baking, the temperature is maintained at the baking temperature of the first baking. In the second baking, after the temperature has reached the baking temperature of the second baking, the temperature is maintained for within 240 hours, preferably for 2 to 48 hours.

The above baking is performed in a baking furnace by charging a zirconium compound into a ceramics container (for example, sagger). As the baking furnace used in the present invention, a batch-type or continuous-type electric furnace and gas baking furnace can be used. Examples of the material of the ceramics container (sagger) include alumina, mullite, mullite cordierite and cordierite.

A zirconium oxide powder obtained by the above baking has a particle diameter converted from a specific surface area measured by a gas adsorption method of 8 to 400 nm, preferably 8 to 200 nm and has a X-ray crystallite diameter calculated by the Debye-Scherrer method from a half band width of a hkl(111) peak of zirconium oxide measured using a powder X-ray diffractometry apparatus of 6 to 250 nm, preferably 6 to 150 nm.

In the present invention, by dispersing a zirconium oxide powder obtained by the baking in an aqueous medium, an aqueous zirconium oxide slurry is obtained and by wet-grinding the obtained slurry, a zirconium oxide sol can be produced. The dispersing can be performed using a wet-grinding apparatus such as a ball mill, a sand grinder and an Attritor and using an altimizer.

The wet-grinding is performed by a method using a non-contiguous-type (batch-type) grinding apparatus and by a method using a continuous-type (circulation-type) grinding apparatus.

During wet-grinding, the concentration of zirconium oxide in the zirconium oxide slurry is preferably 10 to 60% by weight, more preferably 20 to 40% by weight. pH of the aqueous zirconium oxide slurry can be adjusted to 1 to 6 by adding an acidic substance. Examples of the acidic substance include an inorganic acid, such as nitric, sulfuric, hydrochloric and boric acids and an organic acid, such as acetic acid, and additionally thereto, an amino acid such as glycine can be simultaneously added. pH of the aqueous zirconium oxide slurry can be adjusted also to 7 to 12 by adding a basic substance. Examples of the basic substance include sodium hydroxide, potassium hydroxide, tetramethylammonium hydroxide, ethanol amine, diethanol amine, triethanol amine, N,N-dimethylethanol amine, methylethanol amine, monopropanol amine and ammonia; also a water-soluble alkali silicate, such as ammoniumsilicate and quaternary ammonium silicate; and further a water-soluble alkali carbonate, such as quaternary ammonium carbonate. These compounds can be added to the aqueous zirconium oxide sol obtained according to some aspects of the present invention or can be added during wet-grinding.

In the method using a noncontinuous-type (batch-type) grinding apparatus, a zirconium oxide powder in an aqueous medium is wet-ground using stabilized zirconia grinding beads having a diameter of 0.1 to 3.0 mm in a volume ratio of (the zirconium oxide slurry):(the grinding beads) of 1:0.5 to 2.0. A representative noncontinuous-type (batch-type) grinding apparatus is a ball mill apparatus and when this apparatus is used, the wet-grinding is performed, for example at a peripheral-speed of 15 to 110 m/min for 10 to 100 hours.

In the method using a continuous-type (circulation-type) grinding apparatus, a zirconium oxide powder in an aqueous medium is wet-ground using a continuous-type grinding apparatus equipped with stabilized zirconia grinding beads having a diameter of 0.03 to 1 mm, a stirring blade having a peripheral-speed of 1 to 15 m/sec and a grinding container under conditions where an introducing speed of the zirconium oxide slurry into the grinding container is (V/4 to V) L/min relative to a volume V of the grinding container and a volume ratio of (the zirconium oxide slurry):(the grinding beads) is 1: 0-5 to 0.9 in the grinding container. The number of the circulation is usually 50 to 500.

By wet-grinding an aqueous zirconium oxide slurry, an aqueous zirconium oxide sol is obtained. An aqueous zirconium oxide sol has a primary particle diameter of zirconium oxide converted from a specific surface value measured by a gas adsorption method of 8 to 80 nm, preferably 10 to 60 nm. Further, an aqueous zirconium oxide sol has d50 (average particle diameter) of zirconium oxide particles measured by a laser diffractometry ranging from 80 to 150 nm, preferably form 80 to 130 nm and d99 (99% particle diameter) of zirconium oxide particles calculated from a particle size distribution measured by a laser diffractometry of 150 to 500 nm, and docs not contain zirconium oxide particles having a particle diameter of 1 μm or more, preferably 0.6 μm or more as measured by a laser diffractometry. In the aqueous zirconium oxide sol obtained according to some aspects of the present invention, the recovery rate of zirconium oxide in a recovered sol in which sediments are removed by subjecting an obtained aqueous zirconium oxide sol to a treatment using a centrifuge at 2000 G for one minute is 95% or more. At this time, even when zirconium oxide particles of the zirconium oxide sol are agglomerated by a centrifugal force to form coarse sediments, the content of the formed coarse sediments is 7% by weight or less converted into a content of particles having a particle diameter of 1 μm or more in the recovered sediments slurry as measured by a laser diffractometry, and even when a large force is applied to the recovered sol during the polishing, the recovered sol is an aqueous zirconium oxide sol having substantially stability.

The above treatment using a centrifuge is performed as follows. First, the aqueous zirconium oxide sol obtained according to some aspects of the present invention is prepared so as to have a solid content as zirconium oxide of 20%. 36 g of the prepared sol are charged into a centrifuge tube and are subjected to a treatment using a high speed refrigerated centrifuge (trade name: SRX-201; manufactured by Tomy Seiko Co, Ltd.) at 2000 G for one minute. Thereafter, sediments are removed and an aqueous zirconium oxide sol is recovered to weigh the weight thereof. About 3 g of the recovered sol are charged into a 30 cc porcelain crucible and are dried in a dryer of 110° C. Thereafter, the recovered sol is baked at 800° C. to calculate the solid content of zirconium oxide and the recovery rate of zirconium oxide after the treatment. Further, the sediments are redispersed in about 30 g of pure water to measure the particle size distribution thereof using a laser diffractometry particle size distribution measuring apparatus.

The obtained zirconium oxide sol can be used as it is as a polishing composition. However, an additive, such as a water-soluble polymer, an anionic surfactant, a nonionic surfactant, a cationic surfactant such as an amine-based substance and hydrogen peroxide water may be added to the polishing composition either individually or in combination. These additives may be added in a compound state or solution state thereof to a zirconium oxide sol to prepare the polishing composition.

Examples of the water-soluble polymer include a water-soluble organic compound containing a carboxyl group or a salt thereof. The water-soluble organic compound is a polymer or a low molecular weight compound having in the molecule thereof, at least one carboxyl group or one salt thereof. Examples of the water-soluble organic compound include a polymer (A-1) containing ammonium acrylate and/or ammonium methacylate and an amino acid or derivatives thereof (A-2) and further include a water-soluble cellulose such as carboxymethyl cellulose, hydroxyethyl cellulose, hydroxypropylethyl cellulose and hydroxypropyl cellulose, and dextrin.

(A-1) is an ammonium salt of polymers of acrylic acid or methacrylic acid. These polymers may be prepared as a homopolymer, a copolymer of acrylic acid and methacrylic acid and a copolymer with other polymerizable compounds. Examples of the other polymerizable compound as a component of the copolymer include: a monobasic unsaturated carboxylic acid; such as sorbic acid, crotonic acid and tiglic acid; a dibasic unsaturated carboxylic acid, such as muconic acid, maleic acid, fumaric acid, citraconic acid, measaconic acid and itaconic acid; and acrylic esters. Examples of the acrylic esters include 2-hydroxyethyl methacrylate, 2-hydroxypropyl methacrylate, isobutyl methacrylate, t-butyl methacrylate, isobutyl methacrylate, 2-ethylhexyl methacrylate, stearyl acrylate, 2-ethylhexylcarbitol acrylate, 2-methoxyethyl acrylate, butoxyethyl acrylate, ethoxyethoxyethyl acrylate, methoxytriethyleneglycol acrylate, methoxypolyethyleneglycol acrylate, stearyl methacrylate, cyclohexyl methacylate, tetrahydrofurfuryl methacrylate, isobonyl methacrylate, dicyclopentenyl acrylate, benzyl acrylate, phenylglycidyletherepoxy acrylate, phenoxyethyl methacrylate, phenoxypolyediyleneglycol acrylate, nonylphenol ethoxylated acrylate, acryloyloxyethyl phthalate, tribromophenyl acrylate, tribromophenol ethoxylated methacrylate, methyl methacrylate, tribromophenyl methacrylate, methacryloyloxy ethylate, methacryloyloxyethyl malate, methacryloyloxyethyl phthalate, polyethyleneglycol methacrylate, potypropyleneglycol metacrylate, N-methylacrylamide, N-dimethylacrylamide, N-dimethylaminoethyl methacrylate, N-dimethylaminopropylacrylamide, glycidyl methacrylate, n-butyl methacrylate, ethyl methacrylate, allyl methacrylate, cetyl methacrylate, pentadecyl methacrylate, methoxypolyethyleneglycol methacrylate, diethylaminoethyl methacrylate, methacryloyloxyethyl succinate, hexanediol diacrylate, neopentylglycol diacrylate, triethyleneglycol diacrylate, polyethyleneglycol diacrylate, polypropyleneglycol diacrylate, neopentyl hydroxypivalate ester, pentaerytritol diacrylate monostearate, glycol diacrylate, 2-hydroxyethyl met acryloyl phosphate, bisphenol A ethyleneglycol-adduct acrylate, bisphenol F ethyleneglycol-adduct acrylate, tricyclodecanemethanol diacrylate, tris-hydroxyethylisocyanulate diacrylate, 2-hydroxy-1-acryloxy-3-methactyloxypropane, trimethylolpropane tiacrylate, trimethylolpropane ethyleueglycol-adduct triacrylate, trimethylolpropane ethyleneglycol-adduct triacrylate, trimethylolpropane propyleneglycol-adduct triacrylate, pentaerythritol triacrylate, tris-acryloyloxyethyl phosphate, tris-hydroxyethylisocyanulate triacrylate, modified ∈-caprolactone triacrylate, trimethylolpropanethoxy triacrylate, glycerin propyleneglycol-adduct tris-acrylate, pentaerythritol tetraacrylate, pentaerythritol ethyleneglycol-adduct tetraacrylate, ditrimethylolpropane tetraacrylate, dipentaerythritolhexa pentaacrylate, dipentaerythritolmonohydroxy pentaacrylate, urethane acrylate, epoxy acrylate, polyester acrylate and unsaturated polyester.

In (A-1) component, the molar ratio between an ammonium carboxylate and a carboxylate ester in the polymer is 100:0 to 80:20.

As (A-1) component, poly (ammonium acrylate) is most preferably used

Examples of (A-2) component include fatty amino acids, aromatic amino acids. heterocyclic amino acids, salts thereof and amino acid-based surfactants.

Examples of the fatty amino acid include: monoamino monocarboxylic acids, such as glycine, alanine, valine, Ieucine and isoleucine; oxyamino acids, such as serine and threonine; amino acids containing a hetero atom, such as cysteine, cystine and methionine; monoamino dicarboxylic acids, such as aspartic acid and glutamic acid; and diamino monocarboxylic acids, such as lysine and arginine.

Examples of the aromatic amino acid include phenylalanine and tyrosine.

Examples of the heterocyclic amino acid include histidine, tryptophan, proline and oxyproline.

Examples of the salt of these amino acids include ammonium salts, sodium salts and potassium salts of the amino acids.

Examples of the amino acid-based surfactant include N-substituted amino acids and salts thereof, such as N-acyl amino acid and salts thereof.

Examples of the salt include sodium salts (with NaOH), potassium salts (with KOH), salts with triethanolamine and salts with ammonia, such as coconut oil fatty acid sarcosine triethanolamine, coconut oil fatty acid acylalanine triethanolamine, coconut oil fatty acid glutamic acid triethanolamine and lauric acid glutamic acid trichanolamine.

Examples of the anionic surfactant include ammonium oleate, ammonium laurate, triethanolamine lauryl sulfate and ammonium polyoxyethylenelaurylether sulfate.

Examples of the nonionic surfactant include polyoxyethylenelaurylether, polyoxyethylenesorbitan monolaurate, polyoxyethyleneglycol distearate and polyethyleneglycol monostearate.

Examples of the cationic surfactant include: aqueous solutions of amine-based substances, such as quaternary ammonium hydroxide, ethanolamine, diethanolamine, triethanolamine, N,N-dimethylethanolamine, methylethanolamine, monopropanolamine and benzotriazol; water-soluble alkali silicates, such as ammonium silicate and quaternary ammonium silicate; and water-soluble alkali carbonates, such as quaternary ammonium carbonates, for example tetramethylammonium carbonate and tetraethylammonium carbonate.

The polishing composition of the present invention contains 0.5 to 10% by weight of zirconium oxide derived from a zirconium oxide sol and the amount of each of the above additives in the polishing composition is 0.2 to 300 parts by weight, preferably 1 to 200 parts by weight as a solid content, relative to 100 parts by weight of zirconium oxide.

In the present invention, the first baking is for removing a zirconium compound, particularly a zirconium carbonate or another component than zirconium component in a hydrate of the zirconium carbonate by baking to produce zirconium oxide or zirconium oxide precursor.

In the present invention, as a raw material, used is a zirconium carbonate or a hydrate thereof having d50 of zirconium compound particles of 5 to 25 μm and d99 of zirconium compound particles of 60 μm or less, wherein d50 and d99 are measured by measuring a slurry of the zirconium carbonate or a hydrate thereof by a laser diffractometry, and by performing the first baking of the raw material at a moderate temperature elevating rate, zirconium oxide having an uniform primary particle diameter can be produced. Therefore, since among particles of the zirconium oxide sol after the following wet-grinding, there is no coarse large particle, when the zirconium oxide sol is used as a polishing composition, a scratch is not caused on a polished surface.

On the other hand, when a zirconium carbonate or a hydrate thereof which does not satisfy the above particle diameter distribution, particularly a zirconium carbonate or a hydrate thereof containing a lot of large particles is used as a raw material, even if the particle diameter of the zirconium oxide powder after the baking is the same as that in the case where a raw material satisfying the above standard is used, during wet-grinding until a zirconium oxide sol state, the grinding needs to take longer time and as a result, overground products or unground products are likely to be generated, so that a product quality and productivity are lowered.

For example, when a zirconium carbonate or a hydrate thereof having d50 of 20 μm as a raw material was baked finally to 800° C., a zirconium oxide powder having a particle diameter converted by BET method of 85 nm after the baking was obtained and for dispersing the obtained zirconium oxide powder to the particle diameter of the zirconium oxide sol according to some aspects of the present invention, the wet-grinding time needed only 22 hours.

On the other hand, when a zirconium carbonate or a hydrate thereof having d50 of 40 μm as a raw material was baked finally to 750° C., a zirconium oxide powder having a particle diameter converted by BET method of 85 nm after the baking could be also obtained, however, for dispersing the obtained zirconium oxide powder to the particle diameter of the zirconium oxide sol according to some aspects of the present invention, the wet-grinding time needed such a longer time as 75 hours. Moreover, the particle diameter distribution of the obtained zirconium oxide sol contained not only many small diameter particles, but also coarse large diameter particles which could not be ground.

Thus, the particle size distribution of a raw material used influences largely the quality of the final product.

Further, by maintaining a relatively moderate temperature elevating rate in the first baking, when a zirconium carbonate or a hydrate thereof is converted into zirconium oxide, it is believed that zirconium oxide having a small primary particle diameter is generated. Even when such zirconium oxide is subjected to the following baking and wet-grinding, there is generated no coarse large particle, so that such zirconium oxide can be ground to a similar state to that of a primary particle diameter generated in the first baking.

On the other hand, when the first baking is performed with a high temperature elevating rate, zirconium oxide having a large primary particle diameter is likely to be generated and even when thereafter, such zirconium oxide is subjected to the following baking and wet-grinding, in such zirconium oxide, there are present coarse large particles. Therefore, even when such a slurry of zirconium oxide is subjected to the wet-grinding further over a long time period, it results only in overground products or unground products, so that even when such a zirconium oxide sol is used as a polishing composition, a polishing rate is low and a scratch tends to be caused on a polished surface.

Thus, in the production method of the polishing composition containing the zirconium oxide sol according to some aspects of the present invention, by combining a particle diameter distribution of a zirconium carbonate or a hydrate thereof used in the production of a zirconium oxide sol, a temperature elevating rate in the first baking, the following second baking and the wet-grinding, a zirconium oxide sol suitable for a polishing composition can be produced.

The polishing composition containing the aqueous zirconium oxide sol obtained according to some aspects of the present invention is use in a process for planarizing a substrate having an uneven see in a production process of a semiconductor device as a polishing agent for a chemical mechanical polishing. For example, the polishing composition of the present invention is useful as a polishing agent for planarizing a substrate having an uneven surface formed with a copper (Cu) or copper (Cu)-alloy film and a substrate having an uneven surface as a surface to be polished which is formed with an interlayer insulating film, a low dielectric constant film, and an insulating film in a trench separation. Further, the polishing composition of the present invention is useful also as a polishing agent for a quartz crystal composed mainly of silica, a quartz glass for a photo mask and a glass hard disc substrate.

EXAMPLES

The analysis methods employed in the present invention are as follows.
(1) pH Measurement
  pH was measured using a pH meter (trade name: HM-30S; manufactured by To a DKK Corporation).
(2) Electric Conductivity Measurement
  Electric conductivity was measured using an electric conductivity meter (trade name: CM-300; manufactured by To a DKK Corporation).
(3) Measurement of d50 (Average Particle Diameter) by a Laser Diffractometry
  Average particle diameter was measured using a laser diffractometry particle diameter measuring apparatus (trade name: Mastersize 2000; manufactured by Malvern Instruments Ltd.).
(4) Measurement of Particle Diameter (BET Method Converted Particle Diameter) Converted from a Specific Surface Area Value Measured by a Gas Adsorption Method A specific surface area value of a sample which has been dried beforehand under a predetermined condition was measured using a nitrogen adsorption method specific surface area meter (trade name: Monosorb MS-16 type; manufactured by Quntachrome Corporation). Then, BET method converted particle diameter was calculated using the measured value of specific surface area and the following Equation (1):

$$\text{BET method converted particle diameter (nm)} = 6000/(d \times A) \quad (1)$$

wherein d: specific gravity of zirconium oxide=5.5 g/cm³
A: BET specific surface area (m²/g).

(5) Measurement of Powder X-Ray Diffractometry

Using a powder X-ray diffractometry apparatus (manufactured by Shimadzu Corporation), a compound obtained by baiting was determined. Further, a half value width of an hkl (111) peak of zirconium oxide was measured to obtain an X-ray crystallite diameter by the Debye-Scherrer method.

(6) Measurement of Average Particle Diameter by Dynamic Light Scattering Method

Using a dynamic light scattering method particle diameter measuring apparatus (trade name: DLS6000; manufactured by Otsuka Electronics Co., Ltd), an average particle diameter was measured (7) Measurement of Film Thickness of Copper Film Using a sheet resistance measuring apparatus (trade name: VR-120S; manufactured by Kokusai Denki Alpha Co., Ltd,), a sheet resistance of a copper film was measured and from the obtained value. Then, a copper film thickness was calculated, using Equation (2):

$$\text{Copper film thickness} = \text{Copper resistivity } \rho(\Omega\text{-cm})/\text{Sheet resistance } \rho s \, (\Omega/sq) \quad (2)$$

(where Copper resistivity ρ=0.0000017 (Ω-cm)).

(8) Observation of Copper Film Surface

Using a surface observing apparatus 3D digital fine scope (trade name: VC4500; manufactured by Omron Corporation), a copper film surface was observed.

(9) Centrifuge

High speed refrigerated centrifuge (trade name: SRX-201; manufactured by Tomy Seiko Co., Ltd.)

Example 1

2800 g of zirconium oxycarbonate hydrate (which had a content of 39.0% by weight as $ZrO_2$) having an average particle diameter d50 measured by a laser diffractometry of 18.5 μm and having a 99% particle diameter d99 calculated from a particle size distribution measured by a laser diffractometry of 47.7 μM was charged into a mullite ceramics container and the container was capped with a heat resistant plate, followed by baking the content of the container in 72 L electric furnace. At this time, the baking temperature was elevated from room temperature to 350° C. at a temperature elevating rate of 1° C./m and was maintained at 350° C. for 5 hours. Further continuously, the baking temperature was elevated at a temperature elevating rate of 2° C./min to 500° C., was maintained at 500° C. for 10 hours and was cooled down naturally. Thereafter, the ceramics container was taken out of the electric furnace to thereby obtain 1093 g of a zirconium oxide powder. The powder was determined with an X-ray diffractometry apparatus and it was found that the peak of the powder was identified with the characteristic peak of zirconium oxide and the X-ray crystallite diameter thereof was 17.5 nm. Further, the powder had a specific surface area measured by a gas adsorption method of 44.7 m²/g and a particle diameter calculated approximately from the specific surface area (hereinafter, referred to as BET method converted particle diameter) of 24.4 nm.

Into a ball mill apparatus having a polyethylene cylindrical container of radius 70 mm×length 220 mm, 3800 g of partially stabilized zirconia beads having 1 mmφ were charged. With the beads, 369 g of a zirconium oxide powder, 746 g of pure water and 5.4 g of a 10% nitric acid solution were mixed to prepare a zirconium oxide slurry in the ball mill apparatus. The volume ratio of (Zirconium oxide slurry):(Beads) was 1:0.8.

By rotating the cylindrical container at 60 rpm for 24 hours, the zirconium oxide slurry was ground. By water-pushing washing the mixture of the slurry and the beads with pure water, the slurry was separated from the beads and thereafter an aqueous zirconium oxide sol (a-1) having a zirconium oxide concentration of 23.3% by weight, pH of 5.8 and an electric conductivity of 115 μS/cm was obtained. A powder obtained by drying the sol at 300° C. had a BET method converted particle diameter of 19.4 nm. Further, the powder had an average particle diameter d50 measured by a laser diffractometry of 109 μm and d99 of 234 nm and contained no zirconium oxide particle having a particle diameter of 0.6 μm or more. Further, the aqueous zirconium oxide sol had an average particle diameter measured by a dynamic light scattering method of 150 nm.

The obtained aqueous zirconium oxide sol was subjected to a treatment using a centrifuge at 2000 G for one minute. A recovered sol obtained after removing sediments had a recovery rate of zirconium oxide of 98.7%. Further, the recovered sediments slurry had a content of particles of 1 μm or more measured by a laser diffractometry of 6.3%.

Into an aqueous solution continuing glycine having a concentration of 0.12 mol/L, hydrogen peroxide water having a concentration of 0.44 mol/L and benzotriazol having a concentration of 0.001 mol/L, the above zirconium oxide sol was added so that a concentration of zirconium oxide became 5.3% by weight in the mixed solution to thereby prepare a polishing composition.

Example 2

2800 g of zirconium oxycarbonate hydrate (which had a content of 39.8% by weight as $ZrO_2$) having an average particle diameter d50 measured by a laser diffractometry of 16.8 μm and having a 99% particle diameter d99 calculated from a particle size distribution measured by a laser diffractometry of 36.3 μm was charged into a mullite ceramics container and the container was capped with a heat resistant plate, followed by baking the content of the container in 72 L electric furnace. At this time, the baking temperature was elevated from room temperature to 350° C. at a temperature elevating rate of 1° C. min and was maintained at 350° C. for 5 hours. Further continuously, the baking temperature was elevated at 2,C/min to 750° C., was maintained at 750° C. for 10 hours and was cooled down naturally. Thereafter, the ceramics container was taken out of the electric furnace to thereby obtain 1114 g of a zirconium oxide powder. The powder was determined with an X-ray diffractometry apparatus and it was found that the peak of the powder was identified with the characteristic peak of zirconium oxide and the X-ray crystallite diameter thereof was 53.9 nm. Further, the powder had a BET method converted particle diameter of 82.7 nm.

Into a ball mill apparatus having a polyethylene cylindrical container of radius 70 mm×length 220 mm, 3800 g of partially stabilized zirconia beads having 1 mmφ were charged. With the beads, 369 g of a zirconium oxide powder, 746 g of pure water and 3.7 g of a 10% nitric acid solution were mixed to prepare a zirconium oxide slurry in the ball mill apparatus. The volume ratio of (Zirconium oxide slurry):(Beads) was 1:0.8.

By rotating the cylindrical container at 60 rpm for 24 hours, the zirconium oxide slurry was ground. By water-pushing washing the mixture of the slurry and the beads with pure water, the slurry was separated from the beads and thereafter an aqueous zirconium oxide sol (b-1) having a zirconium oxide concentration of 24.9% by weight, pH of 4.5 and an electric conductivity of 67 μS/cm was obtained. A powder obtained by drying the sot at 300° C. had a BET method converted particle diameter of 47.3 nm. Further, the powder had an average particle diameter d50 measured by a laser diffractometry of 105 nm and d99 of 240 nm and contained no zirconium oxide particle having a particle diameter of 0.6 μm or more. Further, the aqueous zirconium oxide sol had an average particle diameter measured by a dynamic light scattering method of 151 nm.

The obtained aqueous zirconium oxide sot was subjected to a treatment using a centrifuge at 2000 G for one minute. A recovered sol obtained after removing sediments had a recovery rate of zirconium oxide of 98.3%. Further, the recovered sediments slurry bad a content of particles of 1 μm or more measured by a laser diffractometry of 2.5%.

Into an aqueous solution containing glycine having a concentration of 0.12 mol/L, hydrogen peroxide water having a concentration of 0.44 mol/L and benzotriazol having a concentration of 0.001 mol/L, the above zirconium oxide sol was added so that a concentration of zirconium oxide became 5.3% by weight in the mixed solution to thereby prepare a polishing composition.

Example 3

2800 g of zirconium oxycarbonate hydrate (which had a content of 39.8% by weight as $ZrO_2$) having an average particle diameter d50 measured by a laser diffractometry of 16.8 μm and having a 99% particle diameter d99 calculated from a particle size distribution measured by a laser diffractometry of 36.3 μm was charged into a mullite ceramics container and the container was capped with a heat resistant plate, followed by baking the content of the container in 72 L electric furnace. At this time, the baking temperature was elevated from room temperature to 350° C. at a temperature elevating rate of 1° C./min and was maintained at 350° C. for 5 hours. Further continuously, the baling temperature was elevated at 2° C./min to 900° C., was maintained at 900° C. for 10 hours and was cooled down naturally. Thereafter, the ceramics container was taken out of the electric furnace to thereby obtain 1114 g of a zirconium oxide powder. The powder was determined with an X-ray diffractometry apparatus and it was found that the peak of the powder was identified with the characteristic peak of zirconium oxide and the X-ray crystallite diameter thereof was 114 nm. Further, the powder had a BET method converted particle diameter of 186 nm.

Into a ball mill apparatus having a polyethylene cylindrical container of radius 70 mm×length 220 mm, 3800 g of partially stabilized zirconia beads having 1 mmφ were charged. With the beads, 369 g of a zirconium oxide powder, 746 g of pure water and 3.7 g of a 10% nitric acid solution were mixed to prepare a zirconium oxide slurry in the ball mill apparatus. The volume ratio of (Zirconium oxide slurry):(Beads) was 1:0.8.

By rotating the cylindrical container at 60 rpm for 45 hours, the zirconium oxide slurry was ground. By water-pushing washing the mixture of the slurry and the beads with pure water, the slurry was separated from the beads and thereafter an aqueous zirconium oxide sol (c-1) having a zirconium oxide concentration of 23.8% by weight, pH of 4.6 and an electric conductivity of 45 μS/cm was obtained. A powder obtained by drying the sol at 300° C. had a BET method converted particle diameter of 58.7 nm. Further, the powder had an average particle diameter d50 measured by a laser diffractometry of 112 nm and d99 of 262 nm and contained no zirconium oxide particle having a particle diameter of 0.6 Sun or more. Further, the aqueous zirconium oxide sol had an average particle diameter measured by a dynamic light scattering method of 171 nm.

The obtained aqueous zirconium oxide sol was subjected to a treatment using a centrifuge at 2000 G for one minute. A recovered sol obtained after removing sediments had a recovery rate of zirconium oxide of 96.0%. Further, the recovered sediments slurry had a content of particles of 1 μm or more measured by a laser diffractometry of 0.3%.

Into an aqueous solution containing glycine having a concentration of 0.12 mol/L, hydrogen peroxide water having a concentration of 0.44 mol/L and benzotriazol having a concentration of 0.001 mol/L, the above zirconium oxide sol was added so that a concentration of zirconium oxide became 5.3% by weight in the mixed solution to thereby prepare a polishing composition.

Example 4

2800 g of zirconium oxycarbonate hydrate (which had a content of 39.9% by weight as $ZrO_2$) having an average particle diameter d50 measured by a laser diffractometry of 19.3 μm and having a 99% particle diameter d99 calculated from a particle size distribution measured by a laser diffractometry of 45.7 μm was charged into a mullite ceramics container and the container was capped with a heat resistant plate. Sixty-four pieces of a ceramics container into which zirconium oxycarbonate hydrate was charged was baked in an electric furnace having a furnace capacity of 1 $m^3$. At this time, the baling temperature was elevated from room temperature to 350° C. at a temperature elevating rate of 0.5° C./min and was maintained at 350° C. for 5 hours. Further continuously, the baking temperature was elevated at 2° C./min to 530° C., was maintained at 530° C. for 10 hours and was cooled down naturally. Thereafter, the ceramics container was taken out of the electric furnace to thereby obtain 72 kg of a zirconium oxide powder. The powder was determined with an X-ray diffractometry apparatus and it was found that the peak of the powder was identified with the characteristic peak of zirconium oxide and the X-ray crystallite diameter thereof was 26.0 nm. Further, the powder had a BET method converted particle diameter of 36.1 nm.

Into a ball mill apparatus having a polyethylene cylindrical container of radius 70 mm×length 220 mm, 3800 g of partially stabilized zirconia beads having 0.5 mmφ were charged. With the beads, 369 g of a zirconium oxide powder, 739 g of pure water and 10.8 g of a 10% nitric acid solution were mixed to prepare a zirconium oxide slurry in the ball mill apparatus. The volume ratio of (Zirconium oxide slurry): (Beads) was 1:0.8.

By rotating the cylindrical container at 60 rpm for 40 hours, the zirconium oxide slurry was ground. By water-pushing washing the mixture of the slurry and the beads with pure water, the slurry was separated from the beads and Thereafter an aqueous zirconium oxide sol (d-1) having a zirconium oxide concentration of 23.3% by weight, pH of 3.9 and an electric conductivity of 209 μS/cm was obtained. A powder obtained by drying the sol at 300° C. had a BET method converted particle diameter of 28.9 nm. Further, the powder had an average particle diameter d50 measured by a laser diffractometry of 92 nm and d99 of 177 nm and contained no zirconium oxide particle having a particle diameter of 0.6 μm or more. Further, the aqueous zirconium oxide sot had an average particle diameter measured by a dynamic tight scattering method of 80 nm.

The obtained aqueous zirconium oxide sot was subjected to a treatment using a centrifuge at 2000 G for one minute. A recovered sot obtained after removing sediments had a recovery rate of zirconium oxide of 99.6%. Further, the recovered sediments slurry contained no particle of 1 μm or more measured by a laser diffractometry.

Into an aqueous solution containing glycine having a concentration of 0.12 mol/L, hydrogen peroxide water having a concentration of 0.44 mol/L and benzotriazol having a concentration of 0.001 mol/L, the above zirconium oxide sot was added so that a concentration of zirconium oxide became 5.3% by weight in the mixed solution to thereby prepare a polishing composition.

Comparative Example 1

3000 g of zirconium oxycarbonate hydrate (which had a content of 40.5% by weight as $ZrO_2$) having an average particle diameter d50 measured by a laser diffractometry of 39.8 μm and having a 99% particle diameter d99 calculated from a particle size distribution measured by a laser diffractometry of 80.3 μm was charged into a mullite ceramics container and the container was capped with a heat resistant plate, followed by baking the content of the container in 72 L electric furnace. At this time, the baking temperature was elevated from room temperature to 350° C. at a temperature elevating rate of 0.5° C./min and was maintained at 350° C. for 5 hours. Further continuously, the baking temperature was elevated at 2° C./min to 700° C., was maintained at 700° C. for 10 hours and was cooled down naturally. Thereafter, the ceramics container was taken out of the electric furnace to thereby obtain 1221 g of a zirconium oxide powder. The powder was determined with an X-ray diffractometry apparatus and it was found that the peak of the powder was identified with the characteristic peak of zirconium oxide and the X-ray crystallite diameter thereof was 41.0 nm. Further, the powder had a BET method converted particle diameter of 79.3 nm.

Into a ball mill apparatus having a polyethylene cylindrical container of radius 70 mm×length 220 mm, 3800 g of partially stabilized zirconia beads having 1 mmφ were charged. With the beads, 369 g of a zirconium oxide powder, 746 g of pure water and 5.5 g of a 10% nitric acid solution were mixed to prepare a zirconium oxide slurry in the ball mill apparatus. The volume ratio of (Zirconium oxide slurry):(Beads) was 1:0.8.

By rotating the cylindrical container at 60 rpm for 37 hours, the zirconium oxide slurry was ground. By water-pushing washing the mixture of the slurry and the beads with pure water, the slurry was separated from the beads and thereafter an aqueous zirconium oxide sol (e-1) having a zirconium oxide concentration of 21.5% by weight, pH of 4.9 and an electric conductivity of 64 μS/cm was obtained A powder obtained by drying the sol at 300° C. had a BET method converted particle diameter of 40.4 nm. Further, the powder had an average particle diameter d50 measured by a laser diffractometry of 118 nm and d99 of 26.7 nm and contained zirconium oxide particle having a particle diameter of 1 μm or more of 9.3%. Further, the aqueous zirconium oxide sol had an average particle diameter measured by a dynamic light scattering method of 145 nm.

The obtained aqueous zirconium oxide sol was subjected to a Docent using a centrifuge at 2000 G for one min. A recovered sol obtained after removing sediments had a recovery rate of zirconium oxide of 97.2%. Further, the recovered sediments slurry had a content of particles of 1 μm measured by a laser diffractometry of 79.3%.

Into an aqueous solution containing glycine having a concentration of 0.12 mol/L, hydrogen peroxide water having a concentration of 0.44 mol/L and benzotriazol having a concentration of 0.001 mol/L, the above zirconium oxide sol was added so that a concentration of zirconium oxide became 5.3% by weight in the mixed solution to thereby prepare a polishing composition.

The polishing using the obtained polishing agent was performed as follows.

The polishing using the obtained polishing agent was performed using as a polishing cloth, an independently foamed polyurethane resin cloth IC-1400 (manufactured by Rodel Nitta Company) and as an object to be polished, a copper electrolysis metallized film, under conditions where the number of rotation of a surface plate was 90 rpm, a polishing pressure was 174 g/cm² and a polishing time was 1 min, using a polishing machine (manufactured by Techno Rise Corporation).

In Table 1, the evaluation of a polished surface was performed by a visual observation and by a surface observation apparatus, and a polished surface having a failure was evaluated as "bad" and a polished surface having no failure at all was evaluated as "good". The polishing speed was calculated from film thicknesses of the copper film before and after the polishing calculated from sheet resistance values of the copper film before and after the polishing.

TABLE 1

| Polishing agent | Polishing speed (nm/min) of copper film | Surface failure visual observation | Surface observation apparatus |
| --- | --- | --- | --- |
| Example 1 | 240 | good | good |
| Example 2 | 450 | good | good |
| Example 3 | 470 | good | goad |
| Example 4 | 170 | good | good |
| Comparative Example 1 | 250 | bad | bad |

By a polishing agent using the aqueous zirconium oxide sol according to some aspects of the present invention obtained in Examples 1 to 4, the same or a more polishing speed as or than that by a polishing agent using the aqueous zirconium oxide sol obtained in Comparative Example 1. Further, from the observation of a polished surface, it was found that while on the polished surface by a polishing agent of Comparative Example 1, a scratch was caused, on the polished surface by a polishing agent according to some aspects of the present invention obtained in Examples 1 to 4, no scratch was caused.

From the above result of observation, it was demonstrated that the aqueous zirconium oxide according to the present invention is useful as a polishing agent used for a chemical and mechanical polishing.

INDUSTRIAL APPLICABILITY

The polishing composition containing the aqueous zirconium oxide sol of the present invention is preferable and suitable as a polishing agent used for a planarization polishing usually referred to as chemical mechanical polish (CMP) in a semiconductor device production process, and can be applied to polishing a wiring made of a metal, such as aluminum, copper and tungsten. Further, the polishing composition of the present invention is preferable and suitable as a polishing agent used for an element separation process of a semiconductor device usually referred to as shallow trench isolation (STI), and is preferable and suitable also as a polishing agent used for polishing a siloxane-based, organic polymer-based, porous material-based, a CVD polymer-based or the like-based low dielectric constant material for an interlayer insulating film of a semiconductor device. Examples of the siloxane-based material include hydrogenated silsesquioxane, methyl silsesquioxane, and hydrogenated methyl silsesquioxane. Examples of the organic polymer-based material include a polyarylene ether, a thermal polymerizable hydrocarbon, a perfluoro hydrocarbon, a polyquinoline, and a fluorinated polyimide. Examples of the porous material include a xerogel and a colloidal silica Examples of the CVD polymer include a diamond-like carbon film, a fluorocarbon, an aromatic hydrocarbon polymer, and a siloxane-based polymer.

Here, a substrate composed mainly of silica is referred to, for example a quartz crystal, a quartz glass, a glass hard disc, an organic film, low dielectric constant film, interlayer insulating film and CMP for trench separation in a semiconductor device. Further, the aqueous zirconium oxide sol of the present invention can be applied to polishing an optical crystal material, such as lithium niobate and lithium tantalate; and a ceramics material, such as aluminum nitride, alumina, ferrite and zirconia.

The invention claimed is:

1. A method of producing a polishing composition containing zirconium oxide sol, comprising:
a first baking of a zirconium compound comprising zirconium compound particles having a d50 of 5 to 25 μm and a d99 of 60 μm or less, wherein the temperature is elevated from room temperature with a temperature elevating rate of 0.1 to 5° C./min until the temperature reaches a first baking temperature in the range of 200 to less than 400° C.,
a second baking of the zirconium compound, wherein the temperature is elevated from the first baking temperature with a temperature elevating rate of 0.1 to 10° C./min until the temperature reaches a second baking temperature in the range of 400 to 1000° C. to obtain a zirconium oxide powder, wherein the second baking is performed immediately after the temperature has reached the first baking temperature, or the second baking is performed after the temperature has been maintained at the first baking temperature for some time, up to about 100 hours; and
wet-grinding the zirconium oxide powder in an aqueous medium until the d50 of zirconium oxide particles becomes 80 to 130 nm and the d99 of zirconium oxide particles becomes 150 to 500 nm, wherein the wet-grinding is performed by grinding the zirconium oxide powder in the aqueous medium by using stabilized zirconia grinding beads having a diameter of 0.1 to 3.0 mm in a volume ratio of (the zirconium oxide slurry):(the grinding beads) of 1:0.5 to 2.0 using a noncontinuous-type grinding apparatus;
wherein:
d50 and d99 are measured by measuring a slurry of the zirconium compound by laser diffractometry, and
the zirconium compound is a zirconium carbonate or a hydrate thereof.

2. The method of producing a polishing composition containing zirconium oxide sol according to claim 1, further comprising removing sediments with a centrifuge after the wet-grinding.

3. A method of producing a polishing composition containing zirconium oxide sol, comprising:
a first baking of a zirconium compound comprising zirconium compound particles having a d50 of 5 to 25 μm and a d99 of 60 μm or less, wherein the temperature is elevated from room temperature with a temperature elevating rate of 0.1 to 5° C./min until the temperature reaches a first baking temperature in the range of 200 to less than 400° C.,
a second baking of the zirconium compound, wherein the temperature is elevated from the first baking temperature with a temperature elevating rate of 0.1 to 10° C./min until the temperature reaches a second baking temperature in the range of 400 to 1000° C. to obtain a zirconium oxide powder, wherein the second baking is performed immediately after the temperature has reached the first baking temperature, or the second baking is performed after the temperature has been maintained at the first baking temperature for some time, up to about 100 hours; and
wet-grinding the zirconium oxide powder in an aqueous medium until the d50 of zirconium oxide particles becomes 80 to 130 nm and the d99 of zirconium oxide particles becomes 150 to 500 nm, wherein the wet-grinding is performed by grinding the zirconium oxide powder in the aqueous medium by using a continuous-type grinding apparatus equipped with stabilized zirconia grinding beads having a diameter of 0.03 to 1 mm, a stirring blade having a peripheral-speed of 1 to 15 m/sec and a grinding container under conditions where an introducing speed of the zirconium oxide slurry into the grinding container is (V/4 to V) L/min relative to a volume V of the grinding container and a volume ratio of (the zirconium oxide slurry):(the grinding beads) is 1:0.5 to 0.9 in the grinding container,
wherein:
d50 and d99 are measured by measuring a slurry of the zirconium compound by laser diffractometry, and
the zirconium compound is a zirconium carbonate or a hydrate thereof.

4. The method of producing a polishing composition containing zirconium oxide sol according to claim 3, further comprising removing sediments with a centrifuge after the wet-grinding.

* * * * *